(12) United States Patent
Bjerre

(10) Patent No.: US 10,782,821 B2
(45) Date of Patent: Sep. 22, 2020

(54) METHOD OF CLASSIFYING A FINGER TOUCH IN RESPECT OF FINGER PRESSURE AND FINGERPRINT SENSING SYSTEM

(71) Applicant: Fingerprint Cards AB, Gothenburg (SE)

(72) Inventor: Troels Bjerre, Valby (DK)

(73) Assignee: Fingerprint Cards AB, Gothenburg (SE)

( * ) Notice: Subject to any disclaimer, the term of this patent is extended or adjusted under 35 U.S.C. 154(b) by 0 days.

(21) Appl. No.: 16/486,744

(22) PCT Filed: Feb. 26, 2018

(86) PCT No.: PCT/SE2018/050178
§ 371 (c)(1),
(2) Date: Aug. 16, 2019

(87) PCT Pub. No.: WO2018/160120
PCT Pub. Date: Sep. 7, 2018

(65) Prior Publication Data
US 2019/0384442 A1    Dec. 19, 2019

(30) Foreign Application Priority Data
Feb. 28, 2017    (SE) ...................... 1750217

(51) Int. Cl.
*G06F 3/041*    (2006.01)
*G06F 3/038*    (2013.01)
*G06K 9/00*    (2006.01)
(52) U.S. Cl.
CPC .......... *G06F 3/0414* (2013.01); *G06F 3/0383* (2013.01); *G06K 9/00067* (2013.01)

(58) Field of Classification Search
CPC ...... G06F 3/0414; G06F 3/0383; G06F 3/041; G06F 3/044; G06K 9/00067;
(Continued)

(56) References Cited

U.S. PATENT DOCUMENTS 6,400,836 B2    6/2002    Senior
7,280,679 B2    10/2007    Russo
(Continued)

FOREIGN PATENT DOCUMENTS

CN    105677082 A    6/2016
EP    0929028 A2    7/1999

OTHER PUBLICATIONS

"A Method to Implement Pressure-Sensitive Control by Measuring the Touch Area of Finger on the Screen," IP.com Journal, Aug. 9, 2011, IP.com Inc., West Henrietta, NY, US, ISSN 1533-0001, 4 pages.
(Continued)

*Primary Examiner* — Sardis F Azongha
(74) *Attorney, Agent, or Firm* — RMCK Law Group, PLC

(57) ABSTRACT

A method of classifying a finger touch in respect of a finger pressure on a surface of a fingerprint sensor, comprising the steps of: receiving, on the surface of the fingerprint sensor, a finger having a fingerprint topography; acquiring a first time-sequence of fingerprint images; determining a reference value of at least one image-related parameter indicative of a compression of the fingerprint topography, based on at least one fingerprint image in the first time-sequence of fingerprint images; acquiring a second time-sequence of fingerprint images; determining a test value of the at least one image-related parameter based on at least one fingerprint image in the second time-sequence of fingerprint
(Continued)

images; and classifying the finger touch based on a relation between the test value and the reference value.

18 Claims, 6 Drawing Sheets

(58) Field of Classification Search
CPC ............. G06K 9/0008; G06K 9/00087; G06K 9/00093; G06K 9/001
See application file for complete search history.

(56) References Cited

U.S. PATENT DOCUMENTS

| | | | | |
|---|---|---|---|---|
| 8,310,372 | B2* | 11/2012 | Kukula | G06K 9/00006 340/5.53 |
| 9,733,745 | B1* | 8/2017 | Kremin | G06F 3/044 |
| 2001/0036299 | A1 | 11/2001 | Senior | |
| 2003/0044051 | A1 | 3/2003 | Fujieda | |
| 2010/0066697 | A1 | 3/2010 | Jacomet et al. | |
| 2016/0033342 | A1 | 2/2016 | Lyon et al. | |
| 2016/0070404 | A1 | 3/2016 | Kerr et al. | |
| 2016/0260225 | A1* | 9/2016 | Thornblom | G06F 3/03547 |
| 2017/0168600 | A1* | 6/2017 | Setterberg | G06F 3/03547 |
| 2018/0032783 | A1 | 2/2018 | Wu et al. | |
| 2018/0224955 | A1* | 8/2018 | Chen | G06F 1/3287 |
| 2019/0180078 | A1* | 6/2019 | Hall | G06K 9/0008 |

OTHER PUBLICATIONS

PCT International Search Report and Written Opinion dated Jun. 25, 2018 for International Application No. PCT/SE2018/050178, 9 pages.

* cited by examiner

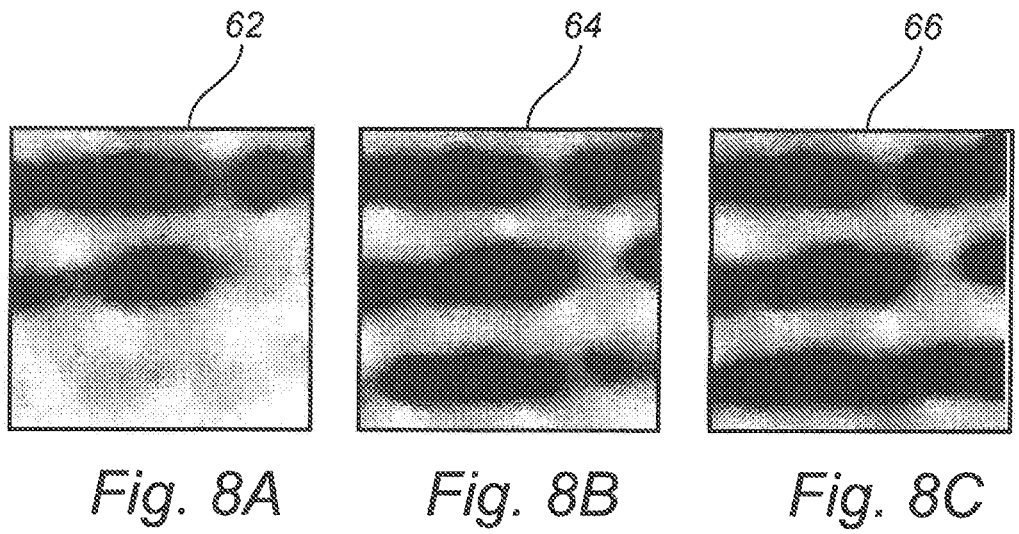

METHOD OF CLASSIFYING A FINGER TOUCH IN RESPECT OF FINGER PRESSURE AND FINGERPRINT SENSING SYSTEM

CROSS-REFERENCE TO RELATED APPLICATIONS

This application is a 371 U.S. National Stage of International Application No. PCT/SE2018/050178, filed Feb. 26, 2018, which claims priority to Swedish Patent Application No. 1750217-0, filed Feb. 28, 2017. The disclosures of each of the above applications are incorporated herein by reference in their entirety.

FIELD OF THE INVENTION

The present invention relates to a method of classifying a finger touch in respect of a finger pressure, and to a fingerprint sensing system.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

In some applications, it would be desirable to be able to classify a finger touch on the fingerprint sensor in respect of finger pressure. This may be useful for, for instance, distinguishing intentional touches from unintentional touches. Further, the ability to distinguish a "hard touch" on the fingerprint sensor from a "soft touch" may be used in a user interface to expand the user interaction with the device including the fingerprint sensor. In addition, a classification of a finger touch, in respect of finger pressure, in respect of multiple thresholds could allow enhanced user interaction.

Various solutions for obtaining auxiliary information about a finger touch on a fingerprint sensor have been proposed.

For example, US 2016/0033342 proposed to add a separate force sensor to form a fingerprint sensor and force sensor system, which may increase the cost and size of the system.

U.S. Pat. No. 6,400,836 discloses to estimate a number representing the force applied on a fingerprint sensor by a finger by computing the area of the fingerprint that is in contact with scanner. This approach appears not to be suitable for fingerprint sensors that are smaller than a typical fingerprint.

U.S. Pat. No. 7,280,679 relates to determining a change in pressure between successive fingerprint images, rather than an absolute pressure level or range. Furthermore, the proposed determination is based on statistical analysis of the acquired fingerprint images, which appears to be rather computationally expensive.

It would therefore be desirable to provide for an improved classification of a finger touch in respect of a finger pressure on a surface of a fingerprint sensor, in particular providing for estimation of an absolute pressure level without requiring a dedicated force sensor.

SUMMARY

In view of above-mentioned and other drawbacks of the prior art, it is an object of the present invention to provide for an improved classification of a finger touch in respect of a finger pressure on a surface of a fingerprint sensor, in particular providing for estimation of an absolute pressure level without requiring a dedicated force sensor.

According to a first aspect of the present invention, it is therefore provided a method of classifying a finger touch in respect of a finger pressure on a surface of a fingerprint sensor, comprising the steps of: receiving, on the surface of the fingerprint sensor, a finger having a fingerprint topography; acquiring a first time-sequence of fingerprint images; determining a reference value of at least one image-related parameter indicative of a compression of the fingerprint topography, based on at least one fingerprint image in the first time-sequence of fingerprint images; acquiring a second time-sequence of fingerprint images; determining a test value of the at least one image-related parameter based on at least one fingerprint image in the second time-sequence of fingerprint images; and classifying the finger touch based on a relation between the test value and the reference value.

The present invention is based upon the realization that a reliable indication of the force exerted by a finger on a relatively small fingerprint sensor can be determined by first analyzing fingerprint images in a first time-sequence of fingerprint images to establish a reliable reference, and then analyzing fingerprint images in a second time-sequence of fingerprint images in relation to this reference.

Through the analysis of the fingerprint images in the first time-sequence to establish the above-mentioned reference, the occurrence of false conclusions in respect of the finger pressure on the sensor surface can be reduced.

It should be noted that the second time-sequence of fingerprint images is acquired after the first time-sequence of fingerprint images.

It should also be understood that a fingerprint image need not be an optical image of the fingerprint topography, but may be a two-dimensional gray scale value representation of the fingerprint topography representing measurement signals provided by sensing elements in an array of sensing elements. The sensing elements may function according to any measurement principle capable of providing one or several parameter(s) indicating a depth dimension of the fingerprint topography, so that an analysis of one or several such parameters can be used to estimate a compression of the fingerprint topography resulting from the finger touch on the surface of the fingerprint sensor.

Such measurement principles include certain capacitive measurement techniques, and ultrasonic measurement techniques etc.

In embodiments of the present invention, the finger touch may be classified in different pressure/force ranges. For instance, the finger touch may be classified as a "hard touch" or a "soft touch". Classification of a finger touch as a "hard touch" may, for example, be used as a condition to proceed with a fingerprint authentication. Further, classification of a finger touch as a "hard touch" may be used as a user interaction with the UI of the electronic device comprising the fingerprint sensing system according to embodiments of the present invention. Moreover, the finger touch may be classified in respect of a larger number of pressure/force ranges. For example, the number of pressure/force ranges may be so large that the classification provides a near continuous representation of the pressure/force exerted by the finger on the surface of the fingerprint sensor.

The fingerprint images in the first time-sequence of fingerprint images and the second time-sequence of fingerprint images may advantageously be acquired at a relatively high acquisition rate, such as at least 50 fingerprint images per second. Such a high acquisition rate may reduce the risk of mistaking a moist finger for a finger touch with a relatively large force/high pressure, which is sometimes referred to as a "hard touch" herein.

According to various embodiments, the method may further comprise the steps of determining at least one evaluation parameter for each fingerprint images in the first time-sequence of fingerprint images; and determining whether the evaluation parameter fulfills a predefined condition, and the reference value of the at least one image-related parameter may be determined based on at least one fingerprint image acquired when the evaluation parameter fulfills the predefined condition.

By evaluating the fingerprint images in the first time-sequence in this manner, the occurrence of false finger touch classifications can be reduced. In particular, various types of soft touches that may be mistaken as a hard touch can be identified and disregarded by postponing the determination of the reference value. For example, instances when the finger is rolled or sliding over the fingerprint sensor surface can be identified and disregarded.

To identify a case when the finger is "rolled" over the fingerprint sensor surface, so that different parts of the fingerprint sensor are covered by the fingerprint topography at different times (for different fingerprint images), the at least one evaluation parameter may include a coverage parameter indicative of a spatial coverage of the fingerprint sensor, and the coverage parameter may be determined to fulfill a coverage condition when at least a sub-area, having a predefined shape, of the fingerprint sensor is covered by the finger.

For example, the fingerprint sensor area used to acquire the fingerprint images in the first time-sequence of fingerprint images may be divided into zones, and the coverage condition may specify which zones need to be covered by the fingerprint topography.

To identify a case when the finger is sliding (moving laterally) on the fingerprint sensor surface, so that the portion of the fingerprint topography that is acquired changes between fingerprint images, the at least one evaluation parameter may include a first difference parameter indicative of an average difference in per-pixel intensity between successive fingerprint images in the first time-sequence of fingerprint images, and the first difference parameter may be determined to fulfill a first difference condition when the average difference in per-pixel intensity between successive fingerprint images is below a first predefined difference threshold value. As long as different portions of the fingerprint topography are acquired in different fingerprint images, the per-pixel intensity (or equivalent measures) will change, and the fingerprint images are not suitable for determination of the above-mentioned reference value.

In particular when the finger is dry, the ridges of the fingerprint topography may make point contact with the sensor surface when the finger pressure is low. When the finger pressure increases, the points grow together to ridges. The present inventor has realized that fingerprint images acquired before the ridge contact has stabilized are not suitable for determination of the above-mentioned reference value.

According to embodiments of the present invention, the at least one evaluation parameter may therefore include a second difference parameter indicative of a difference in intensity range between successive fingerprint images in the first time-sequence of fingerprint images, and the second difference parameter is determined to fulfill a second difference condition when the difference in intensity range between successive fingerprint images is below a second predefined difference threshold value.

According to various embodiments, furthermore, the step of classifying the finger touch may comprise classifying the finger touch as a hard touch when the comparison between the test value and the reference value indicates an increase in the compression of the fingerprint topography greater than a predefined increase.

Another requirement for the classification of the finger touch as a hard touch may be that the comparison between the test value and the reference value indicates a rate of increase in the compression of the fingerprint topography greater than a predefined rate of increase.

The classification in respect of finger pressure may be carried out continuously, after acquisition of each fingerprint image in the second time-sequence of fingerprint images, or following acquisition and processing of a predefined number of fingerprint images in the second time-sequence of fingerprint images.

According to various embodiments, the at least one image-related parameter indicative of the compression of the fingerprint topography may include an image-related parameter indicating a maximum sensed distance (which may correspond to the weakest interaction, such as capacitive coupling) between the fingerprint sensor and the fingerprint topography. Depending on the selected relation between the sensed property that is indicative of distance between sensing elements and the finger surface and the gray scale values of the fingerprint images, the maximum sensed distance may correspond to the highest gray scale value or the lowest gray scale value in the fingerprint image.

By monitoring an image-related parameter (such as the highest or the lowest gray scale value that is determined to be likely to relate to the fingerprint topography), compression of the fingerprint topography can be detected, and compared to a predefined threshold to classify the finger touch as, for instance, a hard touch or a soft touch, and/or to a plurality of predefined thresholds to more finely classify the finger touch. For example, the finger touch may be assigned instantaneous values, each being indicative of an estimated finger pressure on the surface of the fingerprint sensor.

In this context it should, however, be noted that non-functioning sensing elements or disturbances may result in fingerprint image pixels with very high or very low gray scale values that are not related to the fingerprint topography. Such pixel values do not indicate the maximum or minimum distance etc between the surface of the fingerprint sensor and the fingerprint topography. Per se known measures may advantageously be taken to identify and disregard pixel values resulting from non-functioning sensing elements etc.

Alternatively, or in combination, the at least one image-related parameter indicative of the compression of the fingerprint topography may include an image-related parameter indicating a minimum sensed distance (which may correspond to the strongest interaction, such as capacitive coupling) between the fingerprint sensor and the fingerprint topography.

This image-related parameter has been found to be particularly useful for users with dry fingers. As described above, also this image-related parameter may be the highest or the lowest gray scale value that is determined to be likely to relate to the fingerprint topography.

Alternatively, or in combination, the at least one image-related parameter indicative of the compression of the fingerprint topography may include an image-related parameter indicating a difference between a minimum sensed distance or a strongest interaction, and a maximum sensed distance or a weakest interaction between the fingerprint sensor and the fingerprint topography.

According to embodiments of the present invention, the step of determining at least one reference value may comprise: determining a first reference value of a first image-related parameter indicating a maximum sensed distance or a weakest interaction between the fingerprint sensor and the fingerprint topography; determining a second reference value of a second image-related parameter indicating a minimum sensed distance or a strongest interaction between the fingerprint sensor and the fingerprint topography; and determining a third reference value of a third image-related parameter indicating a difference between a minimum sensed distance or a strongest interaction and a maximum sensed distance or a weakest interaction between the fingerprint sensor and the fingerprint topography; and the step of determining at least one test value may comprise: determining a first test value of a first image-related parameter indicating a maximum sensed distance or a weakest interaction between the fingerprint sensor and the fingerprint topography; determining a second test value of a second image-related parameter indicating a minimum sensed distance or a strongest interaction between the fingerprint sensor and the fingerprint topography; and determining a third test value of a third image-related parameter indicating a difference between a minimum sensed distance or a strongest interaction and a maximum sensed distance or a weakest interaction between the fingerprint sensor and the fingerprint topography, and the finger touch pressure may be estimated and the finger touch classified based on: a first relation between the first test value and the first reference value; a second relation between the second test value and the second reference value; and a third relation between the third test value and the third reference value.

The first, second and third relations may be the same or different. For instance, one or several of the relations may be differences or normalized differences.

In embodiments, the steps of determining the test value, and classifying the finger touch may be carried out in sequence for each fingerprint image in the second time-sequence of fingerprint images.

Alternatively, or in combination, the test value may be determined based on a plurality of fingerprint images in the second time-sequence of fingerprint images.

According to various embodiments, furthermore, additional method steps may be carried out only when the finger touch is classified as a hard touch. For instance, to prevent unintended authorization attempts, the following steps may be carried out only when the finger touch is classified as a hard touch: acquiring a candidate fingerprint image; forming a verification representation of the candidate fingerprint image; retrieving a stored enrollment representation of an enrolled fingerprint; comparing the verification representation and the enrollment representation; and determining an authentication result based on the comparison.

According to embodiments, the step of classifying the finger touch may comprise the steps of: estimating the finger pressure on the surface of the fingerprint sensor based on the relation between the test value and the reference value; and providing a signal indicative of the estimated finger pressure.

The signal indicative of the estimated finger pressure may, for example, be provided to an electronic device controller, which may use the signal for controlling the electronic device. In other words, the estimated finger pressure may be used for user interaction, such as navigation, selection, game control etc.

According to a second aspect of the present invention, there is provided a fingerprint sensing system comprising: a finger touch surface for receiving a finger having a fingerprint topography; an array of sensing elements; fingerprint image acquisition circuitry connected to the array of sensing elements for acquiring fingerprint images indicating local distances between the sensing elements and the fingerprint topography; and processing circuitry connected to the fingerprint acquisition circuitry for: controlling the fingerprint image acquisition circuitry to acquire a first time-sequence of fingerprint images; determining a reference value of at least one image-related parameter indicative of a compression of the fingerprint topography, based on at least one fingerprint image in the first time-sequence of fingerprint images; controlling the fingerprint image acquisition circuitry to acquire a second time-sequence of fingerprint images; determining a test value of the at least one image-related parameter based on at least one fingerprint image in the second time-sequence of fingerprint images; and classifying the finger touch based on a relation between the test value and the reference value.

In embodiments, each sensing element in the array of sensing elements may comprise an electrically conducting sensing structure; and the fingerprint acquisition circuitry may be connected to each of the sensing structures for providing sensing signals indicative of a capacitive coupling between each sensing structure and the finger in response to a change in potential difference between a finger potential of the finger and a sensing structure potential of the sensing structure.

In other embodiments, the fingerprint sensing system may be based on a different sensing technology capable of providing sensing signals indicating compression of the fingerprint topography (the depth of fingerprint valleys). An example of such a different sensing technology is ultrasonic sensing. A combination of different sensing technologies may also be used.

The fingerprint sensing system according to embodiments of the present invention may, moreover, advantageously be included in an electronic device, further comprising a device control unit configured to: interact with the fingerprint sensing system to authenticate a user based on a fingerprint representation; and perform at least one action only if the user is authenticated based on the fingerprint representation.

Further embodiments of, and effects obtained through this second aspect of the present invention are largely analogous to those described above for the first aspect of the invention.

BRIEF DESCRIPTION OF THE DRAWINGS

These and other aspects of the present invention will now be described in more detail, with reference to the appended drawings showing an example embodiment of the invention, wherein:

FIGS. 8A-C schematically illustrate a third example evaluation of fingerprint images in the first time-sequence of fingerprint images.

DETAILED DESCRIPTION OF EXAMPLE EMBODIMENTS

In the present detailed description, various embodiments of the method and electronic device according to the present invention are mainly described with reference to a substantially square fingerprint sensor arranged adjacent to the touch display of a mobile phone.

It should be noted that this by no means limits the scope of the present invention, which equally well includes, for example, other electronic devices such as tablets, computers or watches. Furthermore, the fingerprint sensor may have any other shape. For instance, the fingerprint sensor may be provided as an elongated rectangle.

Figure 1:
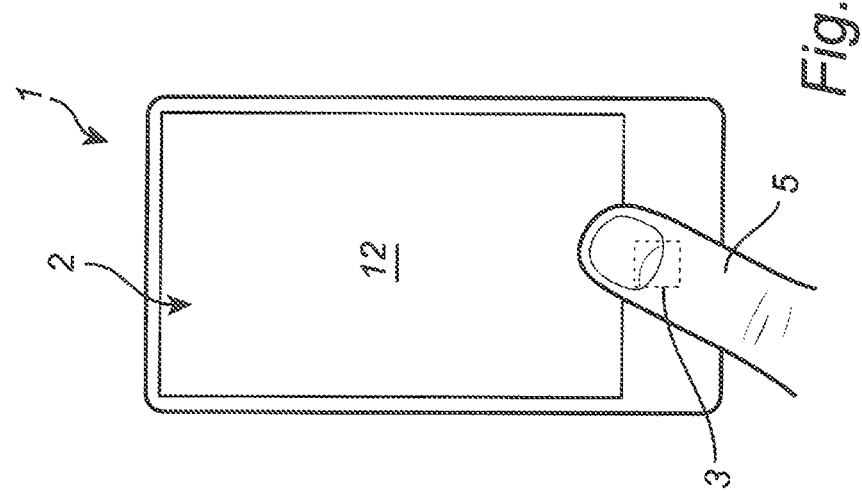
FIG. 1 schematically illustrates an electronic device including a fingerprint sensing device according to an example embodiment of the present invention.

Referring to FIG. 1, an electronic device, here in the form of mobile phone 1, comprises a touch display 2 and a fingerprint sensor 3. The touch display 2 comprises a touch sensor for touch-based control of the mobile phone 1 and a display acting as a user interface.

In FIG. 1, a finger of the user of the mobile phone 1 makes a finger touch on the surface of the fingerprint sensor 3. The finger touch may be made in connection with an authentication attempt, but it may also be the result of simply holding or touching the mobile phone without any intention to perform a fingerprint authentication. If finger touches related to general handling of a mobile phone 1 or other electronic device are interpreted as authentication attempts, several consecutive failed authentications attempts may result. This may cause the mobile phone 1 to temporarily disable fingerprint authentication, which may be perceived as inconvenient by the user. Furthermore, unnecessary electrical energy may be spent on activating the mobile phone and performing unwanted authentication attempts.

This can be prevented by requiring that a minimum finger pressure is applied for performing an authentication attempt, at least when the mobile phone 1 or other electronic device is in a sleep mode. In other words, a "hard touch" may be required to activate particularly energy consuming parts of the mobile phone 1 (such as the touch screen 2) and perform an authentication attempt.

According to embodiments of the present invention, a finger touch can be classified as, for example, such a hard touch, or a "soft touch", that is not sufficient to activate the mobile phone 1 and carry out a fingerprint authentication attempt.

Figure 2:
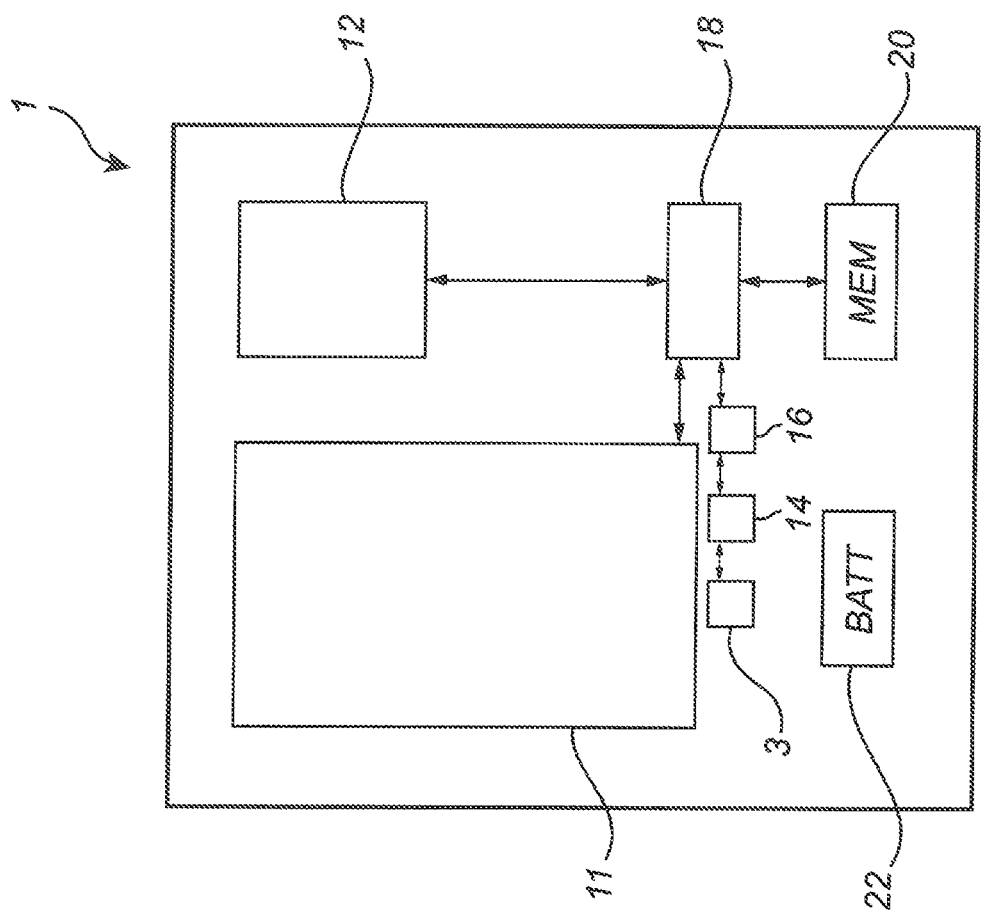
FIG. 2 is a block diagram of the electronic device in FIG. 1.

Referring to the block diagram in FIG. 2, the electronic device 1 in FIG. 1 comprises, in addition to the fingerprint sensor 3, a touch sensor 11 a display 12, fingerprint image acquisition circuitry 14, image processing circuitry 16, a device control unit 18, a memory 20, and a battery 22 for providing electrical energy to the various components of the electronic device 1. Although not shown in FIG. 2, the electronic device may comprise further components depending on application. For instance, the electronic device 1 may comprise circuitry for wireless communication, circuitry for voice communication, a keyboard etc.

An example embodiment of the method according to the present invention will now be described with reference to the flow-chart in FIG. 3, together with the illustrations in additional figures as indicated below.

In a first step 100, the presence of a finger 5 on the surface of the fingerprint sensor 3 is detected. As a result of the detection of the finger 5 (or finger candidate), at least a portion of the sensing array of the fingerprint sensor 3 is activated, as well as the image acquisition circuitry 14 and the image processing circuitry 16. Depending on the implementation, other parts of the electronic device 1, such as the display 12 etc may remain inactive at this stage.

In the subsequent step 101, fingerprint image n in a first time-sequence of fingerprint images is acquired.

Figure 4B:
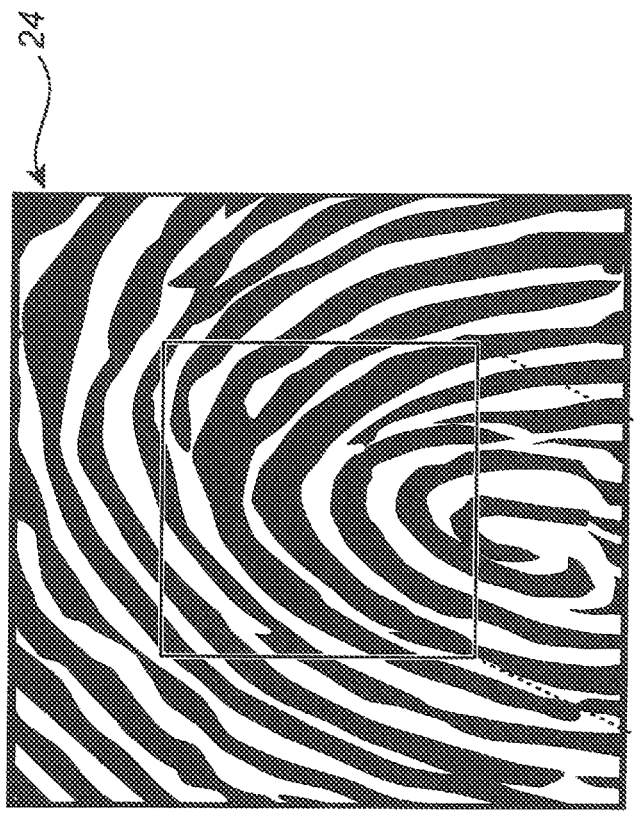
FIGS. 4A-C are example illustrations of fingerprint images used for the finger touch classification according to embodiments of the present invention.
Figure 4C:
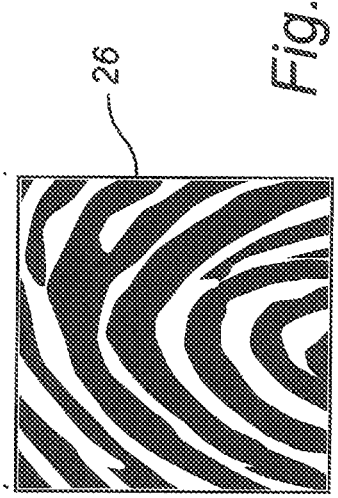
Figure 4A:
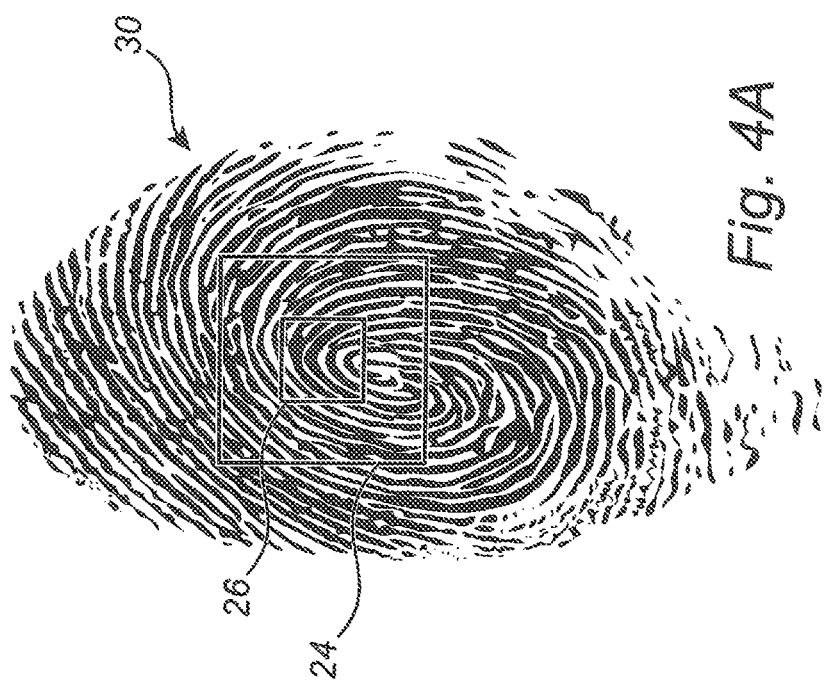

An illustration of a representative size of the array of sensing elements of the fingerprint sensor 3 is provided in FIG. 4A, where a full fingerprint image 24 (which may for example be used for authentication) acquired using the full fingerprint sensor area, and a fingerprint image 26 for finger touch classification acquired using a fingerprint sensor sub-area are shown together with a typical two-dimensional (2D) representation of a fingerprint topography 30.

FIG. 4B is an enlargement of the full fingerprint image 24, and the fingerprint image 26 for finger touch classification, and FIG. 4C is a further enlarged view of the fingerprint image 26 for finger touch classification.

Following the acquisition of fingerprint image n in the first time-sequence of fingerprint images, at least one evaluation parameter fingerprint image n is determined in step 102 to assess whether or not fingerprint image n is suitable as a reference fingerprint image for the finger touch classification according to embodiments of the present invention. This assessment is carried out in step 103.

According to embodiments, various evaluation parameters may be determined and evaluated to determine whether or not fingerprint image n is suitable or not as a reference fingerprint image.

Common to the example evaluation parameters that will be described further below is that they are selected to prevent a premature assignment of a fingerprint image as the reference fingerprint image (or for forming the basis of a composite reference fingerprint image etc), with knowledge of how the method according to embodiments of the present invention classifies a finger touch in respect of finger pressure. For better understanding, the complete example method illustrated by the flow-chart in FIG. 3 will therefore first be described on a general level, before returning to a more detailed descriptions of various parts of the method, including the selection of reference fingerprint image(s) etc.

If it is determined in step 103 that fingerprint image n is not suitable for determination of a reference, then the method proceeds to step 104, where a counter is incremented, before returning to step 101 to acquire a new fingerprint image in the first time-sequence of fingerprint images.

If it is instead determined in step 103 that fingerprint image n is suitable for determination of a reference, then the method proceeds to determine a reference value of at least one image-related parameter indicative of a compression of the fingerprint topography based on fingerprint image n, in step 105.

After having determined the at least one reference value, the method goes on to acquire fingerprint image m in a second time-sequence of fingerprint images, in step 106.

Thereafter, in step 107, a test value of at least one image-related parameter indicative of the compression of the fingerprint topography is determined based on fingerprint image m.

In the next step 108, a relation between the test value and the reference value (or relations between the test values and the reference values) is determined, and thereafter, in step 109, it is determined if the relation indicates a "hard touch".

If the finger touch cannot be classified as a hard touch, the method proceeds to step 110, where a counter is incremented, before returning to step 106 to acquire a new fingerprint image in the second time-sequence of fingerprint images.

In embodiments, it may be continuously monitored if the selected reference fingerprint image is still suitable. In such embodiments, the method may instead proceed from step 110 to step 102.

If it is instead determined in step 109 that the finger touch can be classified as a hard touch, then the method proceeds to step 111, and performs a fingerprint authentication. The fingerprint authentication may involve further steps that are, per se, well-known and that are therefore not described in detail herein. As an alternative to performing a fingerprint authentication, the classification of the finger touch as a hard touch may, for example, be used for navigation (including selection) in the user interface of the electronic device, or other types of user interaction.

To aid in the understanding of the various embodiments of the present invention, the second part of the above-described method will first be described in greater detail, followed by the first part thereof.

Figure 5:
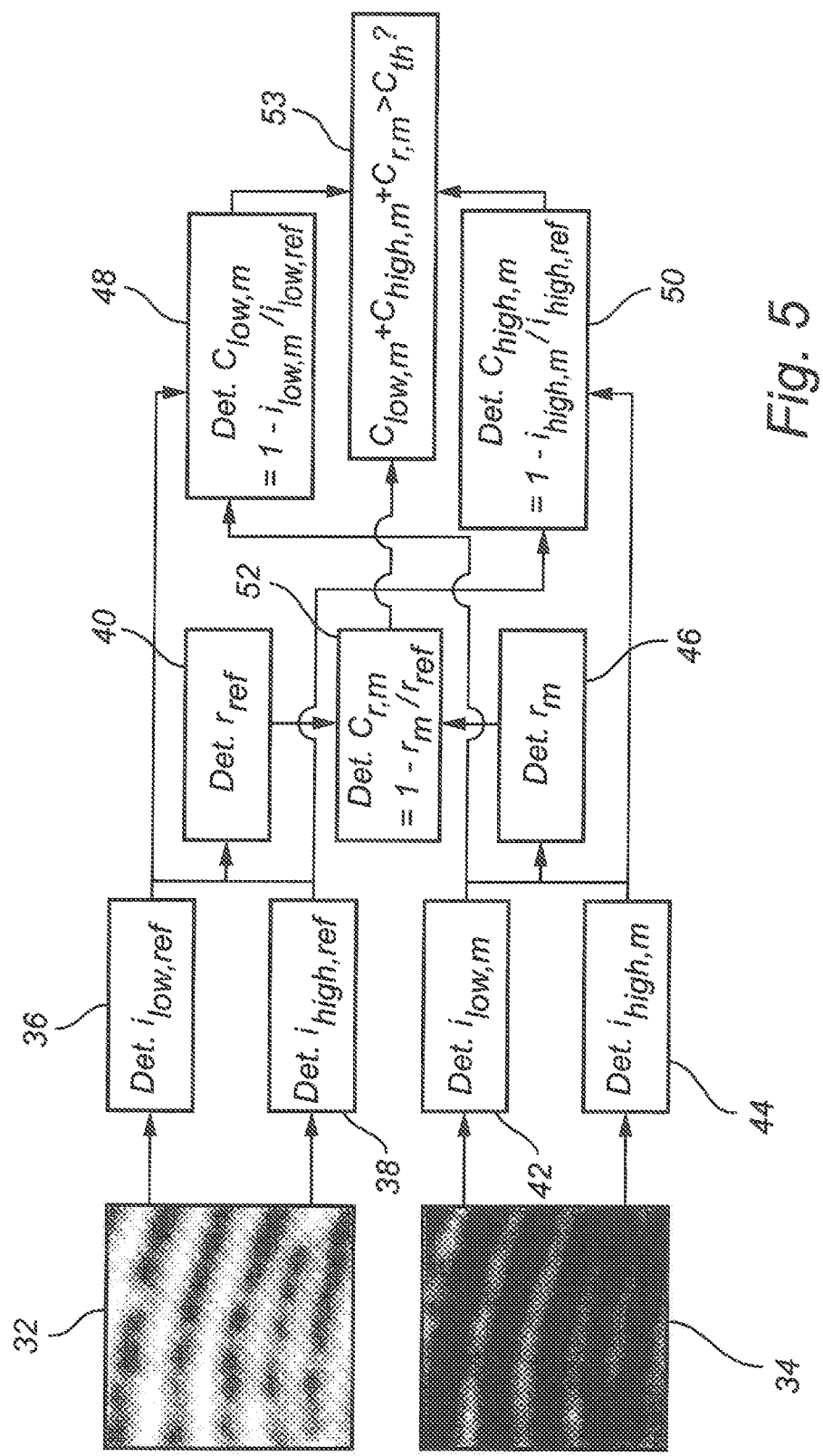
FIG. 5 is a further illustration of a part of the method in FIG. 3.

FIG. 5 is a schematic illustration of determination of reference values based on a reference fingerprint image 32 (step 105), determination of test values based on a test fingerprint image 34 (step 107), determination of relations between the test values and the reference values (step 108), and classification of the finger touch (step 109).

The reference fingerprint image 32 has been selected following an evaluation of fingerprint images in a first time-sequence of fingerprint images as was briefly described above. A more detailed description of the evaluation to determine the reference fingerprint image 32 will be provided further below.

In the presently illustrated example, reference values of three different image-related parameters indicative of a compression of the fingerprint topography are determined based on the reference fingerprint image 32, and corresponding test values of the same image-related parameters are determined based on the test fingerprint image 34 (fingerprint image m in the second time-sequence of fingerprint images).

The first reference value $i_{low,ref}$ relates to the lowest image intensity of the reference fingerprint image 32, which is a first image-related parameter indicating a maximum sensed distance or a weakest interaction, such as a minimum capacitive coupling, between the fingerprint sensor and the fingerprint topography, see box 36 in FIG. 5.

The second reference value $i_{high,ref}$ relates to the highest image intensity of the reference fingerprint image 32, which is a second image-related parameter indicating a minimum sensed distance or a strongest interaction, such as a maximum capacitive coupling, between the fingerprint sensor and the fingerprint topography, see box 38 in FIG. 5.

The third reference value $r_{ref}$ relates to the image intensity range of the reference fingerprint image 32, which is a third image-related parameter indicating a difference between a minimum sensed distance and a maximum sensed distance between the fingerprint sensor and the fingerprint topography, see box 40 in FIG. 5.

The first test value $i_{low,m}$ relates to the lowest image intensity of the test fingerprint image 34 (fingerprint image m), which is a first image-related parameter indicating a maximum sensed distance between the fingerprint sensor and the fingerprint topography, see box 42 in FIG. 5.

The second test value $i_{high,m}$ relates to the highest image intensity of the test fingerprint image 34 (fingerprint image m), which is a second image-related parameter indicating a minimum sensed distance between the fingerprint sensor and the fingerprint topography, see box 44 in FIG. 5.

The third test value $r_m$ relates to the image intensity range of the test fingerprint image 34 (fingerprint image m), which is a third image-related parameter indicating a difference between a minimum sensed distance and a maximum sensed distance between the fingerprint sensor and the fingerprint topography, see box 46 in FIG. 5.

A first relation $c_{low,m}$ between the first test value $i_{low,m}$ and the first reference value $i_{low,ref}$ indicates the negative change of the lowest intensity in the test fingerprint image 34 in relation to the reference fingerprint image 32, see box 48 in FIG. 5.

A second relation $c_{high,m}$ between the second test value $i_{high,m}$ and the second reference value $i_{high,ref}$ indicates the negative change of the highest intensity in the test fingerprint image 34 in relation to the reference fingerprint image 32, see box 50 in FIG. 5.

A third relation $c_{r,m}$ between the third test value $r_m$ and the third reference value $r_{ref}$ indicates the negative change of the intensity range in the test fingerprint image 34 in relation to the reference fingerprint image 32, see box 52 in FIG. 5.

As is indicated in FIG. 5 (box 53), the finger touch is classified has a hard touch when the following condition is fulfilled:

$$c_{low,m} + c_{high,m} + c_{r,m} > C_{th},$$

where $C_{th}$, is a predefined pressure/force threshold value.

Figure 3:
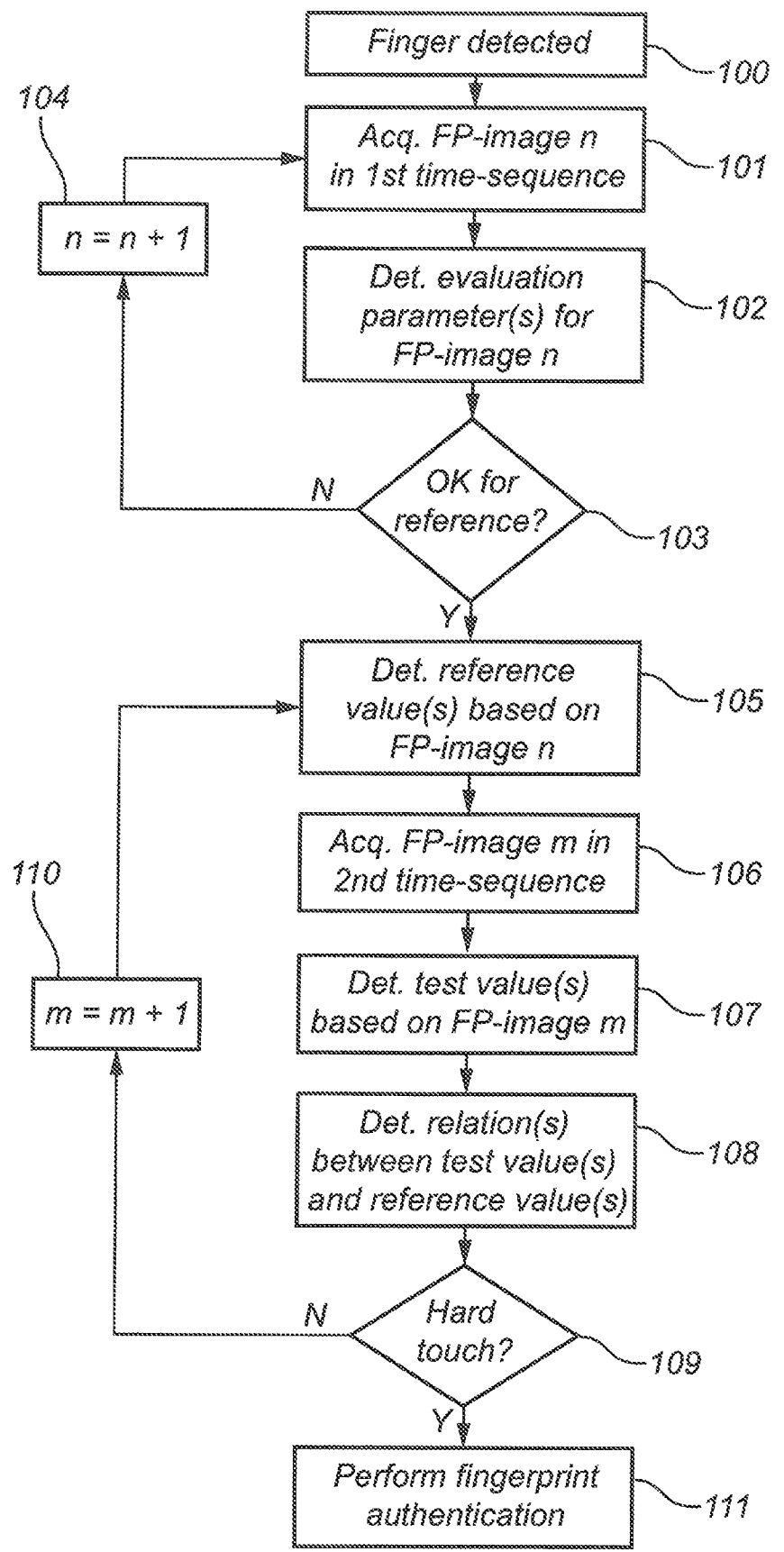
FIG. 3 is a flow-chart schematically illustrating a method according to an embodiment of the present invention.

Based upon the above description of the second part of the method according to the flow-chart in FIG. 3, it can be understood that the classification of the finger touch is highly dependent on the properties of the reference image 32, and that the determination of the reference image 32 is important to the performance of the finger touch classification method.

The present inventor has identified various types initial effects of finger touches for which it would be detrimental to the performance of the finger touch classification to simply select one of the first fingerprint images without evaluating the suitability of a time-sequence of fingerprint images.

A first effect may be referred to as a "rolling finger effect". When the finger 5 is initially "rolled" over the fingerprint sensor 3, or for some other reason initially covers a first sub-area of the fingerprint sensor 3, and thereafter stabilizes to cover a second, different sub-area or the entire sensing area of the fingerprint sensor, a too early determination of the reference value(s) could result in an erroneous classification of the finger touch.

Figure 6:
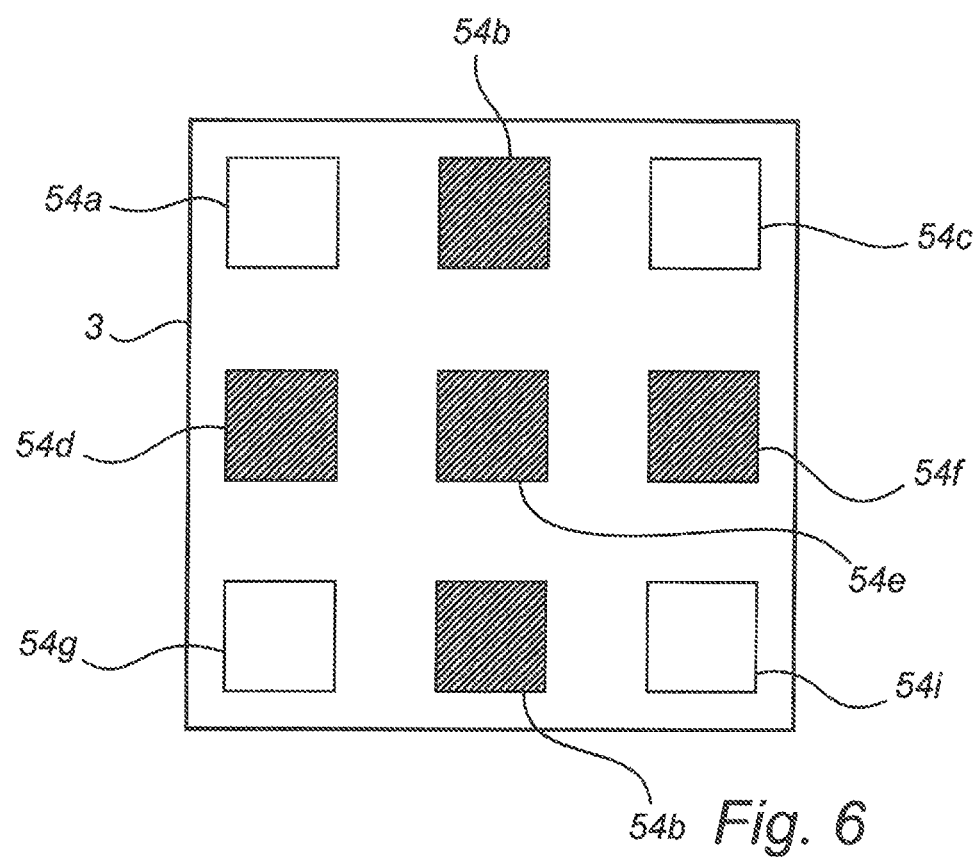
FIG. 6 schematically illustrates a first example evaluation of fingerprint images in the first time-sequence of fingerprint images.

To be able to identify the "rolling finger effect", a coverage parameter indicative of a spatial coverage of the fingerprint sensor 3 can be determined, and evaluated in respect to a predefined condition. Referring to FIG. 6, the fingerprint sensor 3 may, for example, have a number of predefined detection zones 54a-i, the coverage parameter may indicate which of the detection zones 54a-i are covered by the finger 5, and the condition may be that certain of the zones (here 54*b*, 54*d*, 54*e*, 54*f*, and 54*g*) are covered before a reference fingerprint image may be selected.

A second effect may be referred to as a "sliding finger effect". When the finger 5 is initially "sliding" over the fingerprint sensor 3, and thereafter becomes stationary, a too early determination of the reference value(s) could result in an erroneous classification of the finger touch.

To be able to identify the "sliding finger effect", a first difference parameter indicative of a difference in average intensity between successive fingerprint images in the first time-sequence of fingerprint images can be determined, and evaluated in respect to a predefined condition.

Figures 7A, 7B, 7C:
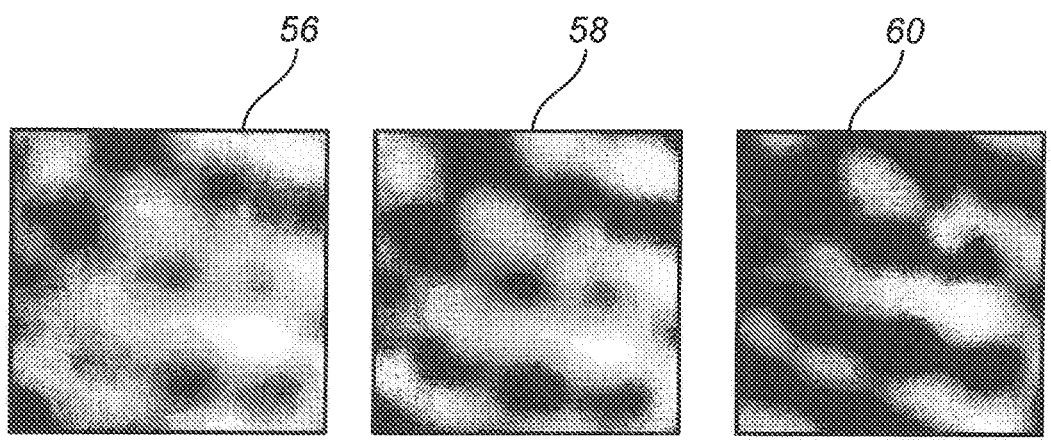
FIGS. 7A-C schematically illustrate a second example evaluation of fingerprint images in the first time-sequence of fingerprint images.

FIGS. 7A-C schematically show three different fingerprint images 56, 58, and 60 in the first time-sequence of fingerprint images.

In the example of FIGS. 7A-C, the finger has moved between the acquisition of the fingerprint image 56 in FIG. 7A and the acquisition of the fingerprint image 58 in FIG. 7B, and between the acquisition of the fingerprint image 58 in FIG. 7B and the acquisition of the fingerprint image 60 in FIG. 7C. As can be expected, the average difference in image intensity (here the root-mean-squared per-pixel intensity difference) between the fingerprint image 56 in FIG. 7A, and the fingerprint image 58 in FIG. 7B is not below a predetermined difference threshold value, and the successive fingerprint images are therefore determined to be acquired while the finger 5 is sliding.

In this illustrative example, it was found that the difference in average image intensity (here the difference in RMS) between successive fingerprint images for the fingerprint image 60 in FIG. 7C was below the predetermined difference threshold value, indicating that the finger 5 is no longer sliding. Therefore, the above-described reference value(s) may be determined based on the fingerprint image 60 in FIG. 7C, and/or a subsequent fingerprint image.

A third effect may be referred to as a "ridge contact effect". In particular for dry fingers, the ridges of the fingerprint topography may initially make point contact with the fingerprint sensor surface. Also in this case, a too early determination of the reference value(s) could result in an erroneous classification of the finger touch.

To be able to identify the "ridge contact effect", a second difference parameter indicative of a difference in intensity range between successive fingerprint images in the first time-sequence of fingerprint images can be determined, and evaluated in respect to a predefined condition.

FIGS. 8A-C schematically show three different fingerprint images 62, 64, and 66 in the first time-sequence of fingerprint images.

In the example of FIGS. 8A-C, the ridges of the fingerprint topography initially make point contact. With increasing finger pressure on the sensor surface, the points grow to lines, which eventually meet to form continuous ridges. In the process of the points growing to lines, it has been found that the intensity range (maximum intensity−minimum intensity) grows between successive fingerprint images. Based on this insight, the second difference parameter can be determined to fulfill a second difference condition when the difference in intensity range between successive fingerprint images is below a second predefined difference threshold value.

As will be appreciated by the skilled person, the scope of the present invention as defined by the appended claims, is not limited to the examples provided above. For instance, a single test value may be compared with a single reference value. In the case of several test values and corresponding reference values, these may indicate other image-related parameters. Furthermore, the determination of the reference value(s) may be based on a single reference fingerprint image or several fingerprint images in the first time-sequence of fingerprint images. Moreover, the evaluation of the fingerprint images in the first time-sequence of fingerprint images may be carried out using one or several of the techniques and conditions described above, or other techniques and conditions that can be used to qualify one or several fingerprint images as being suitable to base the reference value(s) on.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A method of classifying a finger touch in respect of a finger pressure on a surface of a fingerprint sensor, comprising the steps of:

receiving, on the surface of said fingerprint sensor, a finger having a fingerprint topography;

acquiring a first time-sequence of fingerprint images;

determining at least one evaluation parameter for each fingerprint image in said first time-sequence of fingerprint images;

determining whether said evaluation parameter fulfills a predefined condition;

determining a reference value of at least one image-related parameter indicative of a compression of said fingerprint topography, based on at least one fingerprint image in said first time-sequence of fingerprint images, acquired when said evaluation parameter fulfills said predefined condition;

acquiring a second time-sequence of fingerprint images;

determining a test value of said at least one image-related parameter based on at least one fingerprint image in said second time-sequence of fingerprint images; and classifying said finger touch based on a relation between said test value and said reference value.

2. The method according to claim 1, wherein said at least one evaluation parameter includes a coverage parameter indicative of a spatial coverage of said fingerprint sensor, wherein said coverage parameter is determined to fulfill a coverage condition when at least a sub-area, having a predefined shape, of said fingerprint sensor is covered by said finger.

3. The method according to claim 1 or 2, wherein said at least one evaluation parameter includes a first difference parameter indicative of an average per pixel difference in intensity between successive fingerprint images in said first time-sequence of fingerprint images, wherein said first difference parameter is determined to fulfill a first difference condition when said difference in average intensity between successive fingerprint images is below a first predefined difference threshold value.

4. The method according to claim 1, wherein said at least one evaluation parameter includes a second difference parameter indicative of a difference in intensity range between successive fingerprint images in said first time-sequence of fingerprint images, wherein said second difference parameter is determined to fulfill a second difference condition when said difference in intensity range between successive fingerprint images is below a second predefined difference threshold value.

5. The method according to claim 1, wherein the step of classifying said finger touch comprises:
classifying said finger touch as a hard touch when the comparison between said test value and said reference value indicates an increase in the compression of said fingerprint topography greater than a predefined increase.

6. The method according to claim 1, wherein the step of classifying said finger touch comprises:
classifying said finger touch as a hard touch when the comparison between said test value and said reference value indicates a rate of increase in the compression of said fingerprint topography greater than a predefined rate of increase.

7. The method according to claim 1, wherein the step of classifying said finger touch comprises the steps of:
estimating the finger pressure on the surface of said fingerprint sensor based on the relation between said test value and said reference value;
comparing said estimated finger pressure with at least one threshold value; and
classifying said finger touch based on a result of the comparison.

8. The method according to claim 1, wherein said at least one image-related parameter indicative of the compression of said fingerprint topography includes an image-related parameter indicating a maximum sensed distance or a weakest interaction between said fingerprint sensor and said fingerprint topography.

9. The method according to claim 1, wherein said at least one image-related parameter indicative of the compression of said fingerprint topography includes an image-related parameter indicating a minimum sensed distance or a strongest interaction between said fingerprint sensor and said fingerprint topography.

10. The method according to claim 1, wherein said at least one image-related parameter indicative of the compression of said fingerprint topography includes an image-related parameter indicating a difference between a minimum sensed distance and a maximum sensed distance between said fingerprint sensor and said fingerprint topography.

11. The method according to claim 1, wherein:
the step of determining at least one reference value comprises:
determining a first reference value of a first image-related parameter indicating a maximum sensed distance between said fingerprint sensor and said fingerprint topography;
determining a second reference value of a second image-related parameter indicating a minimum sensed distance between said fingerprint sensor and said fingerprint topography; and
determining a third reference value of a third image-related parameter indicating a difference between a minimum sensed distance and a maximum sensed distance between said fingerprint sensor and said fingerprint topography; and
the step of determining at least one test value comprises:
determining a first test value of a first image-related parameter indicating a maximum sensed distance between said fingerprint sensor and said fingerprint topography;
determining a second test value of a second image-related parameter indicating a minimum sensed distance between said fingerprint sensor and said fingerprint topography; and
determining a third test value of a third image-related parameter indicating a difference between a minimum sensed distance and a maximum sensed distance between said fingerprint sensor and said fingerprint topography,
wherein said finger touch is classified based on:
a first relation between said first test value and said first reference value;
a second relation between said second test value and said second reference value; and
a third relation between said third test value and said third reference value.

12. The method according to claim 1, wherein the steps of determining said test value, and classifying said finger touch are carried out in sequence for each fingerprint image in said second time-sequence of fingerprint images.

13. The method according to claim 1, wherein said test value is determined based on a plurality of fingerprint images in said second time-sequence of fingerprint images.

14. The method according to claim 1, wherein, when said finger touch is classified as a hard touch, said method further comprises the steps of:
acquiring a candidate fingerprint image;
forming a verification representation of said candidate fingerprint image;
retrieving a stored enrollment representation of an enrolled fingerprint;
comparing said verification representation and said enrollment representation; and
determining an authentication result based on said comparison.

15. The method according to claim 1, wherein the step of classifying said finger touch comprises the steps of:
estimating the finger pressure on the surface of said fingerprint sensor based on the relation between said test value and said reference value; and
providing a signal indicative of the estimated finger pressure.

16. A fingerprint sensing system comprising:
a finger touch surface for receiving a finger having a fingerprint topography;
an array of sensing elements;
fingerprint image acquisition circuitry connected to said array of sensing elements for acquiring fingerprint images indicating local distances between said sensing elements and said fingerprint topography; and
image processing circuitry connected to said fingerprint image acquisition circuitry for:
controlling said fingerprint image acquisition circuitry to acquire a first time-sequence of fingerprint images;
determining at least one evaluation parameter for each fingerprint image in said first time-sequence of fingerprint images;
determining whether said evaluation parameter fulfills a predefined condition,
determining a reference value of at least one image-related parameter indicative of a compression of said fingerprint topography, based on at least one fingerprint image in said first time-sequence of fingerprint images, acquired when said evaluation parameter fulfills said predefined condition;
controlling said fingerprint image acquisition circuitry to acquire a second time-sequence of fingerprint images;

determining a test value of said at least one image-related parameter based on at least one fingerprint image in said second time-sequence of fingerprint images; and classifying said finger touch based on a relation between said test value and said reference value.

17. The fingerprint sensing system according to claim 16, wherein:

each sensing element in said array of sensing elements comprises an electrically conducting sensing structure; and said fingerprint acquisition circuitry is connected to each of said sensing structures for providing sensing signals indicative of a capacitive coupling between each sensing structure and said finger in response to a change in potential difference between a finger potential of said finger and a sensing structure potential of said sensing structure.

18. An electronic device comprising:

the fingerprint sensing system according to claim 16; and a device control unit configured to:

interact with said fingerprint sensing system to authenticate a user based on a fingerprint representation; and perform at least one action only if said user is authenticated based on said fingerprint representation.

* * * * *